United States Patent
Nishikawa et al.

(10) Patent No.: US 7,567,815 B2
(45) Date of Patent: Jul. 28, 2009

(54) WIRELESS COMMUNICATION APPARATUS FOR SYNCHRONIZING A FRAME CYCLE'S BEGINNING POSITION IN RELATION TO OTHER DEVICES

(75) Inventors: Kenzoh Nishikawa, Kanagawa (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 660 days.

(21) Appl. No.: 11/065,054

(22) Filed: Feb. 25, 2005

(65) Prior Publication Data

US 2005/0195772 A1 Sep. 8, 2005

(30) Foreign Application Priority Data

Mar. 4, 2004 (JP) .............................. 2004-060114
Jan. 17, 2005 (JP) .............................. 2005-009470

(51) Int. Cl.
*H04J 3/00* (2006.01)
*H04J 3/25* (2006.01)

(52) U.S. Cl. ..................... 455/502; 455/136; 455/232.1; 370/336; 370/337; 370/342; 370/348; 370/350; 375/134

(58) Field of Classification Search ................. 455/136, 455/232.1, 502; 370/336, 337, 342, 348, 370/350; 375/134
See application file for complete search history.

(56) References Cited

U.S. PATENT DOCUMENTS

| | | | |
|---|---|---|---|
| 2005/0195772 A1* | 9/2005 | Nishikawa et al. | 370/337 |
| 2006/0223466 A1* | 10/2006 | Behzad | 455/136 |
| 2007/0142012 A1* | 6/2007 | Akamine et al. | 455/232.1 |
| 2007/0160074 A1* | 7/2007 | Yamaguchi et al. | 370/442 |
| 2008/0062956 A1* | 3/2008 | Kuroda et al. | 370/348 |
| 2008/0080475 A1* | 4/2008 | Orth et al. | 370/350 |
| 2008/0144584 A1* | 6/2008 | Sugaya | 370/336 |

OTHER PUBLICATIONS

"Part 11: Wireless LAN Medium Access Control (MAC) and Physical Layer (PHY) specifications", ISO/IEC 8802-11, First Edition, Aug. 20, 1999, 53 pages.
"Broadband Radio Access Networks (BRAN): HIPERLAN Type 2: Data Link Control (DCL) Layer; Part 1: Basic Data Transport Functions", ETSI TS 101 761-1, V1.2.1, Nov. 2000, 87 pages.
"Broadband Radio Access Networks (BRAN): HIPERLAN Type 2; Data Link Control (DLC) layer; Part 2: Radio Link Control (RLC) sublayer", ETSI TS 101 761-2, V1.1.1, Apr. 2000, 186 pages.
"Part 11: Wireless LAN Medium Access Control (MAC) and Physical Layer (PHY) Specifications", ANSI/IEEE STD 802.11, 1999 Edition, Aug. 20, 1999, pp. 123-128.
"Part 11: Wireless LAN Medium Access Control (MAC) and Physical Layer (PHY) specifications: High-speed Physical Layer in the 5 GHZ Band", IEEE STD 802.11A-1999, Sep. 16, 1999, 90 pages.

* cited by examiner

*Primary Examiner*—William D Cumming
(74) *Attorney, Agent, or Firm*—Oblon, Spivak, McClelland, Maier & Neustadt, P.C.

(57) ABSTRACT

A communication station needs to autonomously and synchronously operate by maintaining an equal frame interval. A clock error is measured from a received packet in a wireless communication system where a beacon is transmitted periodically. This clock error is used to synchronize a counter to count the beacon's transmission/reception time and adjust a clock cycle deviation for synchronization. The synchronization is possible even in the case of restoration from a sleep state when the reference clock accuracy is poor. A period to maintain the sleep state can be extended irrespectively of the clock accuracy. It is possible to prevent desynchronization due to incorrect synchronization with an abnormal value.

9 Claims, 14 Drawing Sheets

WIRELESS COMMUNICATION APPARATUS FOR SYNCHRONIZING A FRAME CYCLE'S BEGINNING POSITION IN RELATION TO OTHER DEVICES

CROSS REFERENCES TO RELATED APPLICATIONS

The present invention contains subject matter related to Japanese Patent Applications JP 2004-060114 filed in the Japanese Patent Office on Mar. 4, 2004, and JP 2005-009470 filed in the Japanese Patent Office on Jan. 17, 2005, the entire contents of which being incorporated herein by reference.

BACKGROUND OF THE INVENTION

1. Field of the Invention

The present invention relates to a wireless communication system, a wireless communication apparatus, a wireless communication method, and a computer program such as a wireless LAN (Local Area Network) for intercommunication between a plurality of wireless stations. More specifically, the present invention concerns a wireless communication system, a wireless communication apparatus, a wireless communication method, and a computer program for managing a wireless network by providing direct communication (random access) between communication stations.

Further more specifically, the present invention relates to a wireless communication system, a wireless communication apparatus, a wireless communication method, and a computer program so that communication stations can be networked in an autonomous and distributed manner without providing relationship between a controlling station and a controlled station. In particular, the present invention relates to a wireless communication system, a wireless communication apparatus, a wireless communication method, and a computer program so that respective communication stations can autonomously operate in synchronization with each other by maintaining an equal frame interval.

2. Description of Related Art

Canonical standards concerning wireless networks can include IEEE (The Institute of Electrical and Electronics Engineers) 802.11 (e.g., see non-patent document 1), HiperLAN/2 (e.g., see non-patent document 2 or 3), IEEE802.15.3, and Bluetooth communication, for example. The IEEE802.11 has enhanced standards such as IEEE802.11a (e.g., see non-patent document 4), b, and g depending on differences of wireless communication systems and frequency bands.

According to a general method of constructing a local area network using the wireless technology, there is provided one apparatus called an "access point" or a "coordinator" functioning as a control station inside the area. The network is formed under overall control of the control station. The following access control method based on the band reservation is used for a wireless network where access points are disposed. When a given communication apparatus transmits information, a band needed for the information transmission is reserved for access points. Transmission paths are used so as to avoid collision with the information transmission in the other communication apparatuses.

There may be a case where asynchronous communication is performed between transmitting and receiving communication apparatuses in a wireless communication system containing access points. In this case, the wireless communication always needs to be routed through access points. Consequently, the transmission path performance decreases by half.

Another proposed method of constructing a wireless network is the "ad-hoc communication" that allows terminals to directly and a synchronously perform wireless communication. An ad-hoc wireless communication system has no central control station. Accordingly, this system is suited for constructing a home network comprising domestic electric appliances. The ad-hoc network has several features. For example, if one apparatus fails or is powered off, the routing is automatically changed, making the network strong against crash. Since a packet is hopped more than once between mobile stations, data can be transferred to a relatively distant destination by maintaining a high data rate. There are known various development examples about the ad-hoc system (e.g., see non-patent document 5).

In an IEEE802.11 wireless LAN system, for example, the IEEE802.11 networking comprises a BSS (Basic Service Set) and an IBSS (Independent BSS). The BSS is defined by "infra mode" in which a master such as an access point (control station). The IBSS is defined by "ad-hoc" mode comprising only a plurality of MTs (Mobile Terminals: mobile stations).

The infra mode BSS requires an access point that is responsible for coordination in the wireless communication system. That is, the access point transmits a control signal called a beacon at a proper time interval. When a mobile station can receive the beacon, the mobile station recognizes that the access point is available nearby. Further, the mobile station establishes connection with the access point to define a reachable range of radio waves around the station itself as the BSS, thus constituting a so-called "cell" in terms of the cellular system.

A mobile station near the access point receives a beacon. The mobile station can estimate the next beacon transmission time by decoding an internal TBTT (beacon transmission timing) field. Depending on cases (when no reception is needed), the mobile station may turn off the receiver and enable a sleep state (to be described later) until the next TBTT or several occurrences of TBTT ahead.

On the other hand, when an IBSS in the ad-hoc mode is to be used, a plurality of mobile stations starts negotiations with each other and then autonomously defines the IBSS. When the IBSS is defined, a group of mobile stations completes negotiations and then defines the TBTT at a specified interval. Each mobile station references a clock inside itself to recognize that the TBTT is reached after a random delay time, the mobile station may recognize that no other mobile stations transmit a beacon. In this case, the mobile station transmits a beacon. Also when the IBSS in the ad-hoc mode is to be used, the mobile station may turn off the transmitter-receiver to enable the sleep state as needed.

The IEEE802.11 networking also has a power save mode. A communication station in the power save mode receives only one beacon in several times and performs no transmission or reception in the other periods of time to minimize the power consumption. The access point stores a packet destined to a communication station in the power save mode and notifies the communication station that there is the packet buffered by the beacon. By receiving the beacon, the terminal is notified that there is the packet destined to the terminal itself. The terminal then notifies the access point that the terminal will receive the packet to receive the traffic.

[Non-patent document 1] International Standard ISO/IEC 8802-11:1999 (E) ANSI/IEEE Std 802.11, 1999 Edition, Part 11: Wireless LAN Medium Access Control (MAC) and Physical Layer (PHY) Specifications

[Non-patent document 2] ETSI Standard ETSI TS 101 761-1 V1.3.1 Broadband Radio Access Networks (BRAN);

HIPERLAN Type 2; Data Link Control (DLC) Layer; Part 1: Basic Data Transport Functions

[Non-patent document 3] ETSI TS 101 761-2 V1.3.1 Broadband Radio Access Networks (BRAN); HIPERLAN Type 2; Data Link Control (DLC) Layer; Part 2: Radio Link Control (RLC) sublayer

[Non-patent document 4] Supplement to IEEE Standard for Information technology-Telecommunications and information exchange between systems-Local and metropolitan area networks-Specific requirements-Part 11: Wireless LAN Medium Access Control(MAC) and Physical Layer(PHY) specifications: High-speed Physical Layer in the 5 GHZ Band

[Non-patent document 5] C. K. Tho, "Ad Hoc Mobile Wireless Network" (Prentice Hall PTR)

[Non-patent document 6] IEEE Std 802.11, 1999 Edition (Wireless LAN Medium Access Control and Physical Layer Specification 11.1 Synchronization P123-P128)

As mentioned above, in the autonomous distributed wireless communication system that does not necessarily require the control station, respective communication stations periodically notify beacon information on a channel. In this manner, each communication station notifies its presence and the network configuration to the other neighboring communication stations (i.e., in a communicable range). The communication station transmits a beacon at the beginning of a transmission frame cycle. Accordingly, a transmission frame cycle is defined by a beacon interval. The respective communication stations scan the channel only during a period equivalent to the transmission frame cycle to find beacon signals transmitted from the peripheral stations. The communication station decodes the information described in the beacon to be able to identify the network configuration (or enter the network).

In this wireless communication system, each communication station needs to ensure time synchronization with peripheral stations and periodically notify and manage the beacon information as mentioned above. For example, each communication station sets a prioritized utilization period within a frame cycle. The time synchronization is very important for such access system based on the time synchronization.

Many conventional wireless communication systems requiring time synchronization use an intermediate control station so that respective communication stations can ensure the time synchronization with the control station. This makes it possible to ensure the time synchronization between the respective communication stations existing in the same network.

On the contrary, the autonomous distributed wireless communication system has no relationship between the control station and a controlled station. Since there is no communication station working as the control station, it is impossible to use the conventional method of ensuring the time synchronization.

The infrastructure communication uses the access point as an intermediate to implement the communication. By comparison, the ad-hoc communication requires a large process amount in each communication station. Accordingly, increasing processes is unpreferable for the ad-hoc communication. For this reason, the autonomous distributed communication system requires a technology that can ensure the time synchronization with communication stations using a relatively simple process.

For example, as described in Non-patent document 2, IEEE802.11 adopts the clock synchronization method that notifies time stamp information describing the beacon transmission station's transmission time by including that information in a beacon. In this case, a communication station receiving the beacon adjusts the station's time to the same value as the time stamp in the infra mode. In the ad-hoc mode, the communication station adjusts the station's time to the same value as the time stamp when the time stamp value is later than the station's time. In this manner, the communication station always measures a clock error to adjust the time for synchronization.

Acquisition of the clock synchronization needs to not only correct misalignment of the time used as a basis for communication stations, but also synchronize the time progress rate (i.e., clock cycle). However, the clock synchronization method using the time stamp information can only perform the former, i.e., the time synchronization.

When the clock accuracy is insufficient, let us consider a case where a communication station in the power save mode keeps the sleep state for a long time. When the communication station receives no beacon too long, the time misalignment between communication stations exceeds a tolerance. Consequently, the clock accuracy restricts a period that permits the sleep state to continue in the power save mode.

SUMMARY OF THE INVENTION

The present invention has been made in consideration of the foregoing. It is therefore a major object of the present invention to provide a wireless communication system, a wireless communication apparatus, a wireless communication method, and a computer program excellent at being able to allow respective communication stations to network in an autonomous distributed manner without using a specific control station.

It is another object of the present invention to provide a wireless communication system, a wireless communication apparatus, a wireless communication method, and a computer program excellent at being able to allow respective communication stations to autonomously operate in synchronization with each other by maintaining an equal frame interval.

The present invention has been made in consideration of the foregoing. According to a first aspect of the present invention, there is provided a wireless communication system in which respective communication stations operate at specified frame cycles, wherein a first communication station transmits a notification signal containing time information about a frame cycle; and wherein a second communication station synchronizes not only a frame cycle's beginning position with the first communication station, but also a frame cycle based on time information obtained from a received notification signal.

In this context, the term "system" signifies a logical set of a plurality of apparatuses (or function modules to implement a specific function). It is indefinite about whether or not the apparatuses or function modules are contained in a single cabinet.

The wireless communication system according to the present invention has no specific coordinator to be disposed. Each communication station issues beacon information to notify its presence and the network configuration to the other neighboring communication stations. When a communication station newly enters the communication range of a given communication station, for example, that new communication station receives a beacon signal to detect that it enters the communication range. In addition, the communication station decodes information contained in the beacon to be able to recognize the network configuration.

When no neighboring communication station is available in this situation, the communication station can start sending a beacon at a proper timing. The new entrant communication station subsequently configures its beacon transmission timing within the communication range so as not to collide with the disposition of the existing beacons. Each communication station obtains a transmission prioritized period immediately after beacon transmission. Beacons are disposed according to an algorithm to sequentially configure the new entrant communication station's beacon transmission timings approximately at the center timing of beacon intervals configured by existing communication stations.

However, the autonomous distributed wireless communication system needs to periodically notify the above-mentioned beacon information and manage the beacon information while each communication station ensures time synchronization with peripheral stations. For example, each communication station sets the prioritized utilization period TPP within a frame cycle. The time synchronization is very important for such access system based on the time synchronization.

The clock accuracy may be insufficient in a wireless network system that has the sleep mode and periodically performs reception. In such case, the clock accuracy restricts a period that permits the sleep state to continue.

To solve this problem, the present invention provides two synchronization processes for clock synchronization acquisition: correction of misalignment in timestamps used as the reference between communication stations and synchronization of the time progress rate (i.e., clock cycle). A clock error is measured from a received packet. Using this clock error, the communication station synchronizes a counter to count the beacon's transmission/reception time and adjusts a clock cycle deviation for synchronization with peripheral stations.

Accordingly, if the communication station has insufficient reference clock accuracy, the communication station can synchronize with a peripheral station when restoring from the sleep state. A period to maintain the sleep state can be extended irrespectively of the clock accuracy. It is possible to prevent desynchronization due to incorrect synchronization with an abnormal value.

Each communication station has a clock generator to generate a reference clock. Counting this clock makes it possible to measure the frame cycle. In this case, the second communication station measures a frame cycle's beginning position error between the second and first communication stations as clock count error $\alpha$. The second communication station subtracts $\alpha$ from a count value to be able to synchronize the frame cycle's beginning position. The second communication station extends the count cycle per frame by $\alpha$ to be able to synchronize the frame cycle.

When the communication station receives a beacon from a peripheral station in the same system that comprises three or more communication stations, a clock error obtained from the beacon may increase suddenly. This situation may occur immediately after the beacon transmission station also shifts the timestamps for clock synchronization.

The communication station may not change the cycle when a count error for the frame cycle's beginning position becomes too large to fit in an allowable range. This prevents a change to an incorrect cycle, ensures resistance to clock variations, and stabilizes clock (frame) synchronization operations due to moderate cycle variations.

The wireless network according to the present invention can use the sleep mode and permit respective communication stations to sleep at any time. When the sleep mode is used, each communication station returns to be active at a specified wake-up cycle (or scan cycle). The communication station performs a scan operation to receive a beacon from a peripheral station for synchronization.

In this case, the communication station synchronizes the frame cycle first at a small interval of periodical reception operations or scan operations as transient synchronization of the frame cycle. When an error becomes sufficiently small with respect to the peripheral station at the frame's beginning position, the communication station gradually extends the scan cycle and repeats the operation to synchronize the frame cycle again. Finally, it is possible to maintain the frame cycle synchronization between communication stations even at a long scan cycle in the normal state.

Even when the clock accuracy is unchanged, a short scan cycle causes a small count error at the beginning position of the frame cycle to be measured. As a result, the frame cycle can be appropriately adjusted while observing the above-mentioned rule not to change the cycle when a count error for the frame cycle's beginning position becomes too large to fit in an allowable range.

When an error exceeds a specified threshold with respect to the peripheral station at the frame's beginning position, the communication station shortens the scan cycle to synchronize the frame cycle's beginning position. However, no clock cycle is synchronized. This is because the clock may deviate due to a cause other than a clock cycle deviation immediately after the beacon transmission station also shifts the timestamps for clock synchronization, for example.

There may be other triggers to shorten the scan cycle. For example, reception of a new beacon or a request for association can recognize a new entrant communication station. Alternatively, a beacon or a transmission packet is provided with a flag to indicate a clock cycle change and this flag is recognized in a received beacon or packet.

Immediately after a beacon transmission station shifts the timestamp for the purpose of clock synchronization, a clock error resulting from the beacon reception may increase suddenly. In consideration for this, the first communication station may notify this possibility by providing a beacon or a transmission packet immediately after the synchronization with a flag to indicate the clock cycle change. When the frame's beginning position is greatly changed, this flag is set for transmission during the system's maximum scan cycle. Let us assume that the second communication station receives the flagged notification signal. When the frame cycle's beginning position error exceeds a specified threshold in this case, the second communication station synchronizes the frame cycle's beginning position with the first communication station, but does not synchronize the frame cycle.

The reference time of the new entrant communication station does not match that of the already existing network. When the first beacon is received, this difference is detected as a clock error. In consideration for this, no clock cycle is corrected by using a clock error value estimated from the new entrant terminal's first beacon. This makes it possible to prevent an incorrect clock cycle change.

According to a second aspect of the present invention, there is provided a computer program described in a computer-readable form so as to allow a computer system to process communication under wireless communication environment where notification signals are transmitted periodically, comprising the steps of:

generating a notification signal containing time information about a clock cycle;

analyzing a notification signal received from a peripheral station; and synchronizing a frame cycle's beginning position in relation to a peripheral station based on time information obtained from a notification signal received from the peripheral station and adjusting frame cycle synchronization.

The computer program according to the second aspect of the present invention is defined as a computer program described in a computer-readable form so as to implement specified processes on a computer system. In other words, when the computer program according to the second aspect of the present invention is installed in a computer system, the computer system exhibits cooperative effects and operates as a wireless communication apparatus. A plurality of such wireless communication apparatuses can be activated to construct a wireless network. In this manner, it is possible to provide effects similar to those of the wireless communication system according to the first aspect of the present invention.

The present invention can provide a wireless communication system, a wireless communication apparatus, a wireless communication method, and a computer program excellent at being able to allow respective communication stations to autonomously operate in synchronization with each other by maintaining an equal frame interval.

The present invention enables the clock cycle synchronization. Even though a communication station does not synchronize with the clock for a specified period due to a sleep operation, for example, the communication station can easily synchronize with the other stations.

It is possible to extend a period to continue the sleep state independently of the clock accuracy.

According to the present invention, the communication station can shift the time by maintaining the clock cycle. The communication station can prevent incorrect cycle setting as a result of following an instantaneous cycle change.

According to the present invention, the communication station can synchronize the clock cycle even though the clock accuracy is insufficient. Further, the synchronization can be maintained even at along wake-up cycle. Since the scan frequency needs not be higher than needed, the communication station can reduce power consumption.

The communication station may temporarily vary a beacon cycle by adjusting the time. Even though a neighboring station receives a beacon from such communication station, the present invention can prevent the neighboring station from incorrectly changing the clock cycle.

When a new communication station enters, an existing communication station may change the clock cycle to an incorrect one to cause clock desynchronization. The present invention can prevent this phenomenon.

These and other objects, features, and advantages of the invention may be readily ascertained by referring to the following description of the embodiment and appended drawings.

DETAILED DESCRIPTION OF THE PREFERRED EMBODIMENTS

An embodiment of the present invention will be described in further detail with reference to the accompanying drawings.

The present invention assumes wireless transmission paths for communication and constructs a network between a plurality of communication stations. The present invention assumes the communication in terms of store-and-forward traffic. Information is transferred in units of packets. In the description below, respective communication stations assume a single channel. In addition, the enhancement is possible when a transmission medium to be used comprises a plurality of frequency channels, i.e., multi-channels.

A wireless network according to the present invention uses the transfer (MAC) frame having a moderate time division multiplex access structure to provide transfer control by effectively using channel resources. Communication stations follow an access procedure based on CSMA (Carrier Sense Multiple Access) to transfer information directly and asynchronously, making it possible to construct autonomous distributed wireless network. The embodiment according to the present invention assumes IEEE802.11a, an enhanced standard of IEEE802.11, to be communication environment.

Since the wireless communication system has no relationship between the control station and controlled stations, communication stations issue beacon information. In this manner, each communication station notifies its presence and the network configuration to the other neighboring communication stations (i.e., within a communication range). When a communication station newly enters the communication range of a given communication station, that new communication station receives a beacon signal to detect that it enters the communication range. In addition, the communication station decodes information contained in the beacon to be able to recognize the network configuration.

Processes in respective communication stations to be described are basically performed in all communication stations entering the network. Depending on cases, however, all communication stations constituting the network not perform the processes to be described below.

A. Apparatus Configuration

Figure 1:
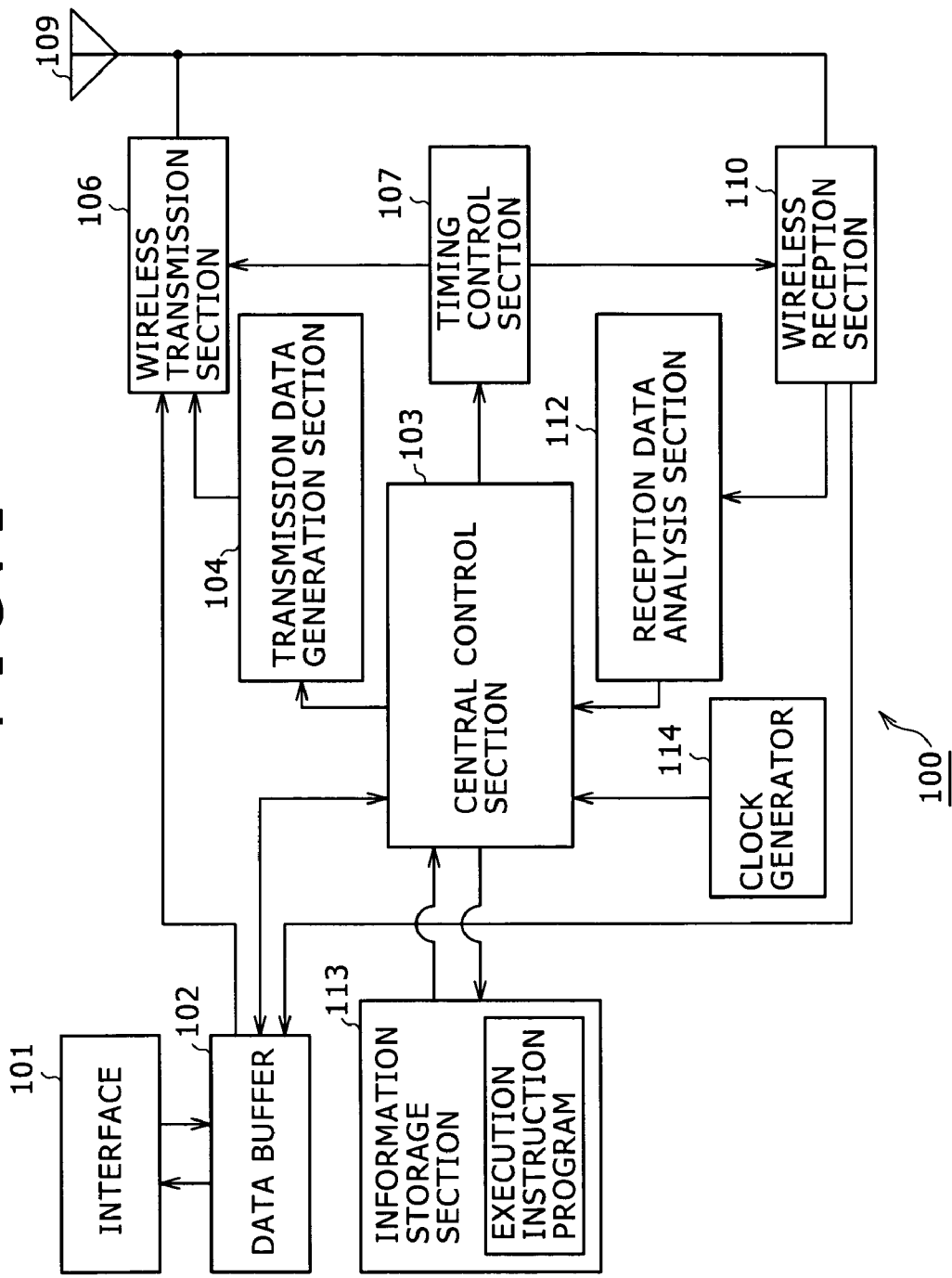
FIG. 1 schematically shows the function configuration of a wireless communication apparatus operating as a communication station in a wireless network according to an embodiment of the present invention.

FIG. 1 schematically shows the function configuration of a wireless communication apparatus operating as a communication station in a wireless network according to the embodiment of the present invention. A wireless communication apparatus 100 in FIG. 1 effectively performs channel access in the same wireless system to be able to form a network by avoiding collision.

As shown in FIG. 1, the wireless communication apparatus 100 comprises: an interface 101; a data buffer 102; a central control section 103; a transmission data generation section 104; a wireless transmission section 106; a timing control section 107; an antenna 109; a wireless reception section 110; a reception data analysis section 112; an information storage section 113; and a clock generator 114.

The interface 101 interchanges various information with external devices (e.g., a computer (not shown) and the like) connected to the wireless communication apparatus 100.

The data buffer 102 temporarily stores data sent from devices connected via the interface 101 or data received via a wireless transmission path before the data is transmitted via the interface 101.

The central control section 103 centrally manages transmission and reception of a series of information and manages transmission path accesses in the wireless communication apparatus 100. Basically, the central control section 103 monitors transmission path states and operates a backoff timer during a random time period based on the CSMA procedure. The central control section 103 provides access control of acquiring the transmission right when no transmission signal is available during this period.

The central control section 103 operates on a reference clock supplied from the clock generator 114. For example, the central control section 103 has a counter to count reference clocks and acquires a frame cycle as a basis for network operations. Further, according to the embodiment, the central control section 103 performs clock synchronization between communication stations. The clock synchronization method includes two factors: correction of misalignment in timestamps used as the reference between communication stations and synchronization of the time progress rate (i.e., clock cycle).

The transmission data generation section 104 generates packet signals and beacon signals destined for a peripheral station from the local station. In this context, packets include not only a data packet, but also a Request To Send (RTS) packet from the communication station as reception destination, a Clear to Send (CTS) packet and an Acknowledgment (ACK) packet in response to RTS. For example, a data packet is generated as a payload by extracting a specified length of transmission data stored in the data buffer 102. The beacon describes a counter value during the transmission.

The wireless transmission section 106 includes, though not shown, a modulator, a D/A converter, an upconverter, and a power amplifier (PA). The modulator modulates transmission signals by means of a specified modulation system such as OFDM (Orthogonal Frequency Division Multiplexing). The D/A converter converts digital transmission signals into analog signals. The upconverter upconverts analog transmission signals by converting frequencies. The power amplifier amplifies power of the upconverted transmission signal. The wireless transmission section 106 performs wireless transmission of packet signals at a specified transmission rate.

The wireless reception section 110 comprises, though not shown, a low-noise amplifier (LNA), a downconverter, an automatic gain controller (AGC), an A/D converter, and a demodulator. The low-noise amplifier voltage-amplifies a signal received from another station. The downconverter downconverts the voltage-amplified reception signal by converting frequencies. The A/D converter converts the analog reception signal into a digital signal. The demodulator demodulates signals by means of synchronization for synchronization establishment, channel estimation, and the demodulation system such as OFDM.

The antenna 109 wirelessly transmits signals to another wireless communication apparatus over a specified frequency channel. Alternatively, the antenna 109 collects signals transmitted from another wireless communication apparatus. The embodiment assumes that a single antenna is provided and cannot perform transmission and reception concurrently.

The timing control section 107 provides timing control to transmit and receive wireless signals. For example, the timing control section 107 controls its packet transmission timing, timing to transmit packets (RTS, CTS, data, and ACK) compliant with the RTS/CTS system, and timing to transmit and receive beacons.

The reception data analysis section 112 analyzes packet signals (including analysis of RTS and CTS signals) and beacon signals received from other stations. In order to synchronize clocks, for example, the reception data analysis section 112 extracts a beacon counter value during beacon transmission from a beacon signal.

The information storage section 113 stores: an instruction program for execution procedure such as a series of access control operations executed in the central control section 103; and information obtained from results of analyzing received packets and beacons.

B. Constructing an Autonomous Distributed Network Based on Beacon Information Interchange In the autonomous distributed network according to the embodiment, each communication station issues beacon information on a specified channel at a specified time interval. In this manner, the communication station notifies its presence and the network configuration to the other neighboring communication stations (i.e., within a communication range). The description here defines a "super frame", i.e., a transmission frame cycle to transmit beacons. For example, one super frame is assumed to be 40 milliseconds.

A new entrant communication station listens to a beacon signal from a peripheral station through a scan operation to detect an entry to the communication range. At the same time, the communication station decodes information contained in the beacon to be able to recognize the network configuration. Moderately synchronized with the beacon reception timing, the communication station sets its beacon transmission timing to a timing at which no beacon is transmitted from the peripheral station.

Figure 2:
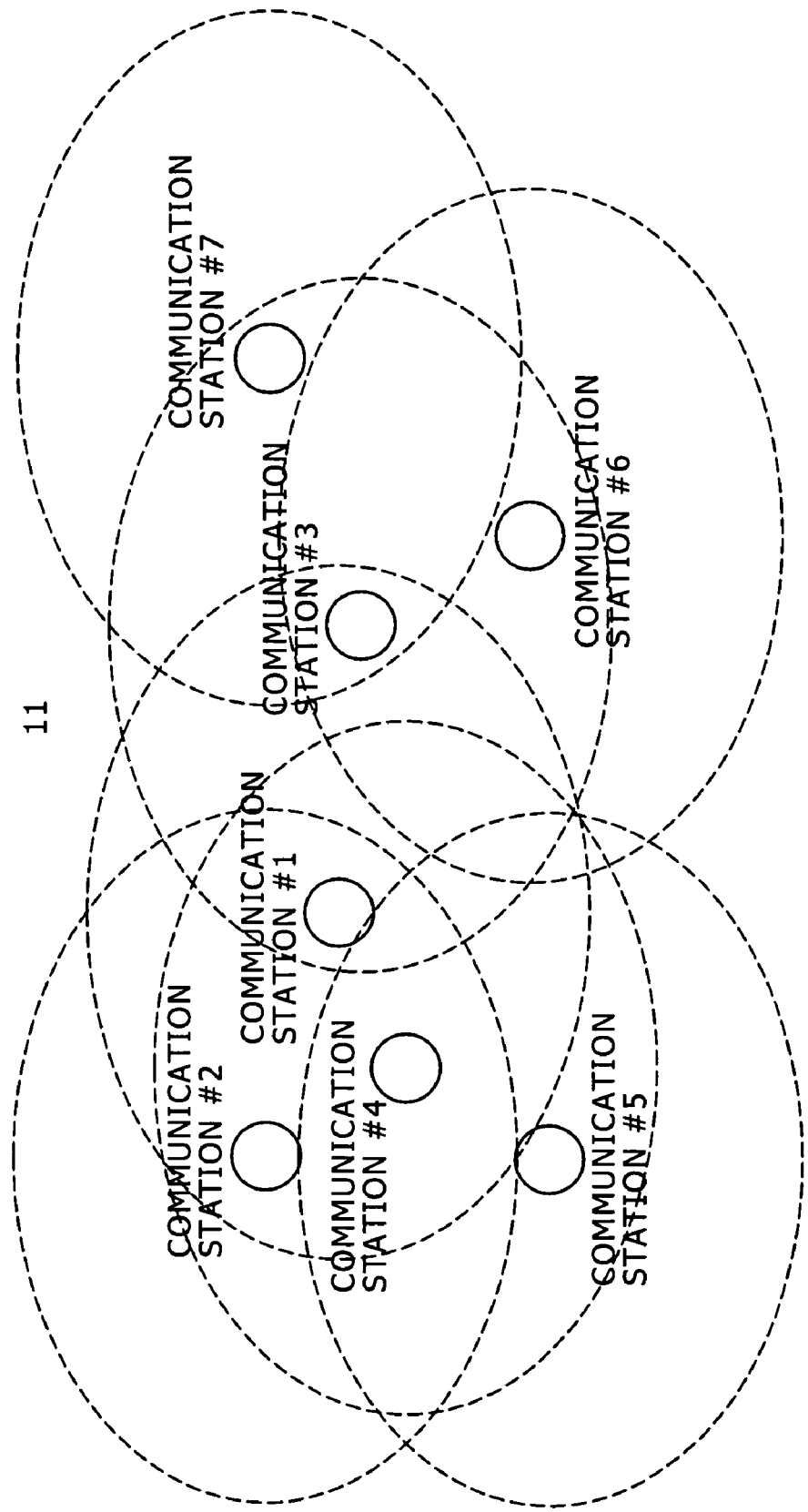
FIG. 2 schematically shows an autonomous distributed network according to the embodiment of the present invention.

FIG. 2 schematically shows an autonomous distributed network according to the embodiment of the present invention. The network in FIG. 2 disposes a plurality of wireless communication apparatuses #1 through #7 in the space. Neighboring communication stations can directly communicate with each other.

Communication apparatus #1 can directly communicate with neighboring communication apparatuses #2, #3, and #4 in a reachable wave range 11 (a broken-line oval centered around communication apparatus #1), but cannot directly communicate with communication apparatuses #5, #6, #7 outside the range. Communication apparatus #2 can directly communicate with neighboring communication apparatuses #1 and #4, but cannot directly communicate with the other communication apparatuses #3, #5, #6, and #7. Communication apparatus #3 can directly communicate with neighboring communication apparatuses #1, #6, and #7, but cannot directly communicate with the other communication apparatuses #2, #4, and #5. Communication apparatus #4 can directly communicate with neighboring communication apparatuses #1, #2, and #5, but cannot directly communicate with the other communication apparatuses #3, #6, and #7. Communication apparatus #5 can directly communicate only with neighboring communication apparatuses #4, but cannot directly communicate with the other communication apparatuses #1, #2, #3, #6, and #7. Communication apparatus #6 can directly communicate only with neighboring communication apparatuses #3, but cannot directly communicate with the other communication apparatuses #1, #2, #4, #5, and #7. Communication apparatus #7 can directly communicate only with neighboring communication apparatuses #3, but cannot directly communicate with the other communication apparatuses #1, #2, #4, #5, and #6.

Each communication station issues beacon information on the channel in the autonomous distributed wireless communication system having no control station disposed. In this manner, the communication station notifies its presence and the network configuration to the other neighboring communication stations (i.e., within a communication range). The communication station transmits a beacon at the beginning of a transmission frame cycle. Accordingly, a transmission frame cycle is defined by a beacon interval.

The respective communication stations scan the channel only during a period equivalent to the transmission frame cycle to find beacon signals transmitted from the peripheral stations. The communication station decodes the information described in the beacon to be able to identify the network configuration. In this specification, a beacon transmission cycle is defined as a "super frame (T_SF)".

Each communication station assumes its beacon transmission timing to be the beginning of the super frame. In other words, each communication station uniquely generates the super frame configuration so as to prevent the start timing from matching that for the super frame configuration of the neighboring station.

Figure 3:
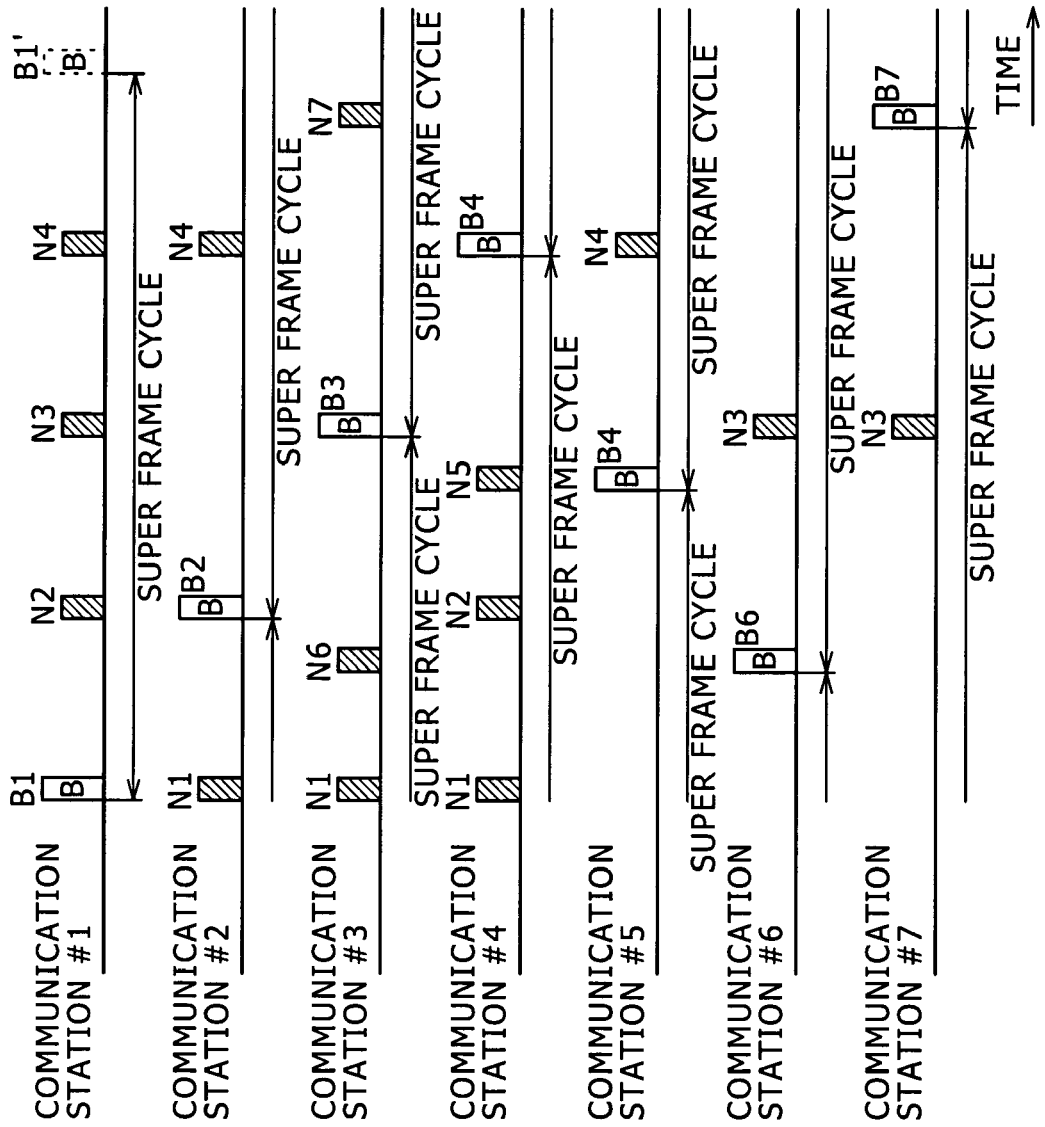
FIG. 3 shows a procedure in which communication stations transmit beacons within a super frame.

Referring now to FIG. 3, the following describes how each communication station transmits beacons within the super frame in the autonomous distributed network according to the embodiment.

According to an example in FIG. 3, wireless communication apparatus #1 receives beacon signals (N2, N3, and N4) from neighboring communication apparatuses #2, #3, and #4. Wireless communication apparatus #1 transmits its own beacon signal (B1) at a timing independent of these beacon signals. Wireless communication apparatus #1 configures a cycle up to a timing (B1') to transmit the next beacon signal as its own super frame duration.

Communication apparatus #2 can receive beacon signals (N1 and N4) from neighboring communication apparatuses #1 and #4. Communication apparatus #3 can receive beacon signals (N1, N6, and N7) from neighboring communication apparatuses #1, #6, and #7. Communication apparatus #4 can receive beacon signals (N1, N2, and N5) from neighboring communication apparatuses #1, #2, and #5. Communication apparatus #5 can receive a beacon signal (N4) from neighboring communication apparatus #4. Communication apparatus #6 can receive a beacon signal (N3) from neighboring communication apparatus #3. Communication apparatus #7 can receive a beacon signal (N3) from neighboring communication apparatus #3.

The new entrant communication station subsequently configures its beacon transmission timing within the communication range so as not to collide with the disposition of the existing beacons.

Figure 4:
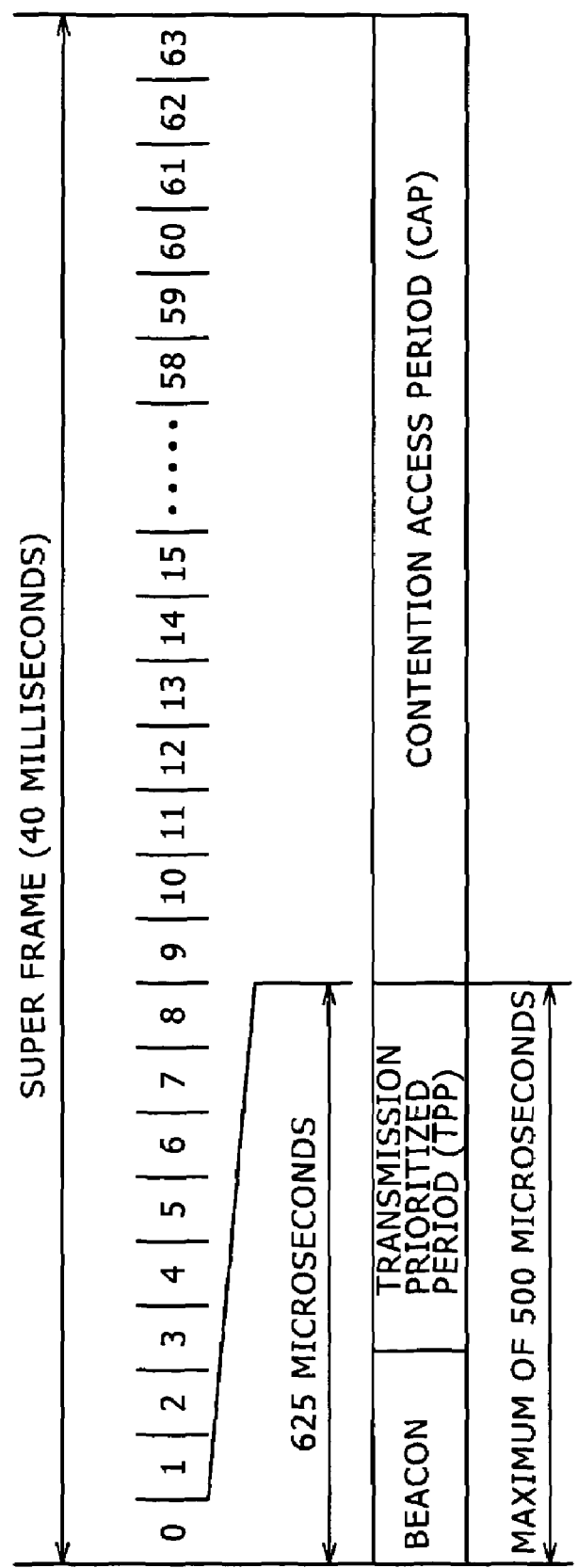
FIG. 4 schematically shows an internal configuration of the super frame.

FIG. 4 schematically shows an internal configuration of the super frame managed for each communication station in the autonomous distributed network according to the embodiment. Each communication station transmits a beacon to define its super frame. The following describes the usage in the super frame.

Each communication station defines a super frame duration by transmitting its own beacon. On the basis of the beacon transmission timing, the super frame is managed as further segmented beacon relative positions at every beacon relative position. According to the example in FIG. 4, one super frame is divided into 64 portions provided with 64 relative positions, i.e., slots 0 through 63.

At a starting beacon relative position (position number 0), the beacon transmission is followed by its own TPP (Transmission Prioritized Period). In the transmission prioritized period TPP, the corresponding wireless communication apparatus becomes active to transmit messages from itself or receive messages destined to itself.

A CAP (Contention Access Period) is provided corresponding to a location (position numbers 1 through 63) other than beacon relative position 0. When there arises a communication need, the CAP is used between neighboring wireless communication apparatuses as needed.

A period defined as the transmission prioritized period TPP terminates when a specified communication terminates or when no communication takes place. The transmission prioritized period TPP is automatically used as the contention access period CAP between neighboring stations as needed. Alternatively, the communication station may configure part of the contention access period CAP as its own transmission prioritized period TPP. That part of the contention access period CAP may be preferentially used for communication with a specified wireless communication apparatus.

According to the embodiment, the communication station handles the super frame in units of slots. The communication station configures a communication band used for itself based on the band usage of peripheral stations.

C. Acquiring Time Synchronization in the Autonomous Distributed Network

As mentioned above, respective communication stations periodically notify beacon information in the autonomous distributed wireless communication system. In this manner, each communication station notifies its presence and the network configuration to the other neighboring communication stations. The communication station transmits a beacon at the beginning of the super frame. Accordingly, the super frame is defined by a beacon interval. The respective communication stations scan the channel to find beacon signals transmitted from the peripheral stations and enter the network.

In this autonomous distributed wireless communication system, each communication station needs to ensure time synchronization with peripheral stations and periodically notify and manage the beacon information as mentioned above. For example, each communication station sets a prioritized utilization period within a frame cycle. The time synchronization is very important for such access system based on the time synchronization.

The clock accuracy may be insufficient in a wireless network system that has the sleep mode and periodically performs reception. In such case, the clock accuracy restricts a period that permits the sleep state to continue.

Acquisition of the clock (frame) synchronization includes two factors: correction of misalignment in timestamps (frame cycles) used as the reference between communication stations and synchronization of the time progress rate (i.e., clock or frame cycle). As premises of the present invention, measurement can be used to detect an error at the beginning of timestamps (frame cycles). However, measurement cannot be used to detect whether or not time progress rates are synchronized. The following shows several proposed methods of acquiring the clock (frame) synchronization.

C-1. Clock (Frame) Synchronization Method (1)

As mentioned above, in the autonomous distributed communication system according to the embodiment, each communication station has a counter that is incremented by the reference clock and is reset by the periodic beacon transmission time. A beacon records the counter value during beacon transmission. By receiving the beacon, the communication station can keep track of a delay in its timestamps with reference to a communication station that transmitted the beacon.

Figure 5:
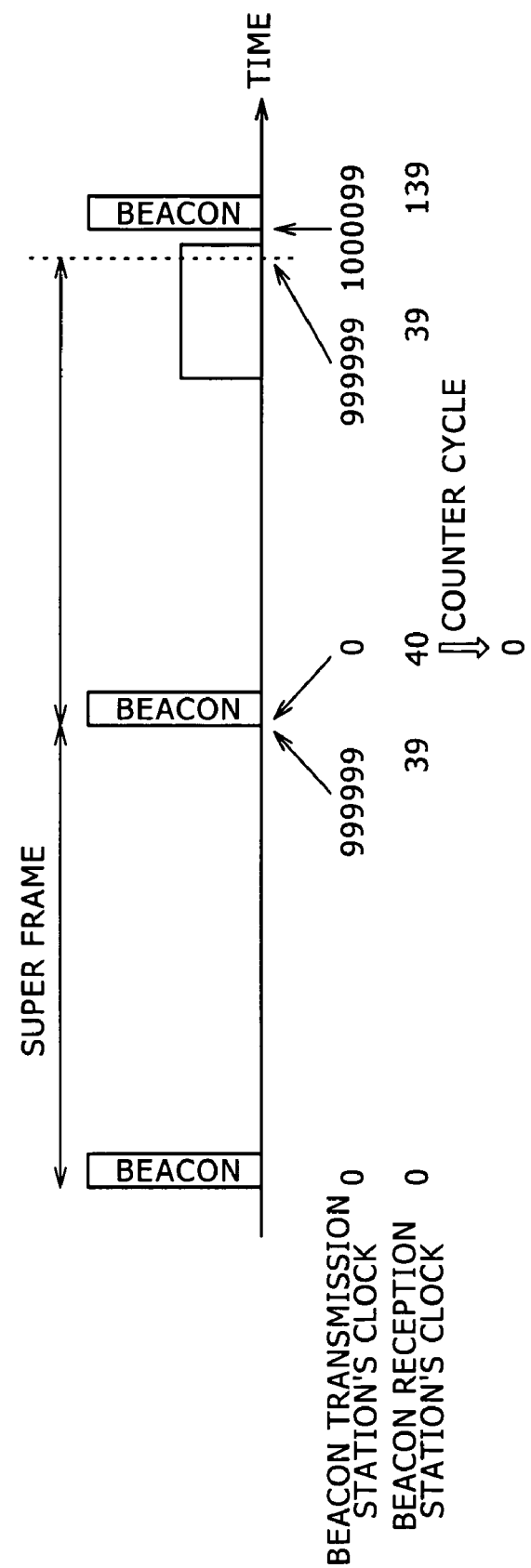
FIG. 5 shows a procedure to synchronize clocks between communication stations that interchange beacons.

FIG. 5 shows a procedure to synchronize clocks (frames) between communication stations that interchange beacons. FIG. 3 shows operations up to three beacons including one that is transmitted from a beacon transmission station and is received by a beacon reception station. At an initial stage of the operation, each communication station handles one super frame equivalent to a period to count the reference clock 1000000 times.

The beacon transmission station issues a beacon signal when the local station's counter returns to 0. In response to reception of the beacon, the beacon reception station resets the counter to 0 when the beacon transmission station transmits the beacon. This corrects misalignment of the timestamps as the reference and synchronizes the counters between the communication stations.

Thereafter, the respective communication stations use their reference clocks to measure the time, i.e., increment the counters from 0 to 999999. The beacon transmission station issues a beacon signal when the local station's counter returns to 0.

At the second beacon transmission time, the beacon reception station returns the counter to 0 and already advances it to 40. The reason follows. When the beacon transmission station's clock is used as the reference, the beacon reception station's clock is counted 40 ahead per super frame. That is, the clock advances 40 ppm.

According to a conventional clock synchronization method based only on the timestamp information, the beacon reception station can synchronize the time by resetting the counter to correct the time misalignment each time it receives a beacon. However, the beacon reception station cannot reset the counter during a period in which the station enters the sleep state. The time misalignment is accumulated on the super frame basis. The clock accuracy, if insufficient, restricts a period during which the sleep state can continue.

According to the embodiment, by contrast, the beacon reception station not only resets the counter to correct the time misalignment each time it receives a beacon, but also synchronizes the time progress rate, i.e., the clock cycle. Specifically, the beacon reception station resets the counter to 0 from 40 at the second beacon reception. At this point, the beacon reception station advances the counter 40 per super frame. That is, the beacon reception station finds a 40 ppm advance in the clock and extends the clock cycle by 40/1000000. As a result, the beacon reception station uses one super frame to handle a period to increment from 0 to 1000039. At the third beacon reception, the beacon reception station can synchronize with the beacon transmission station's clock (frame).

According to the embodiment, the beacon reception station resets the counter 40 counts later, namely, counts up to 1000039 and then resets the counter. In addition, there may be several methods for correcting the clock cycle. One example is to use the PLL (Phase Lock Loop) to directly extend the clock.

Figure 6:
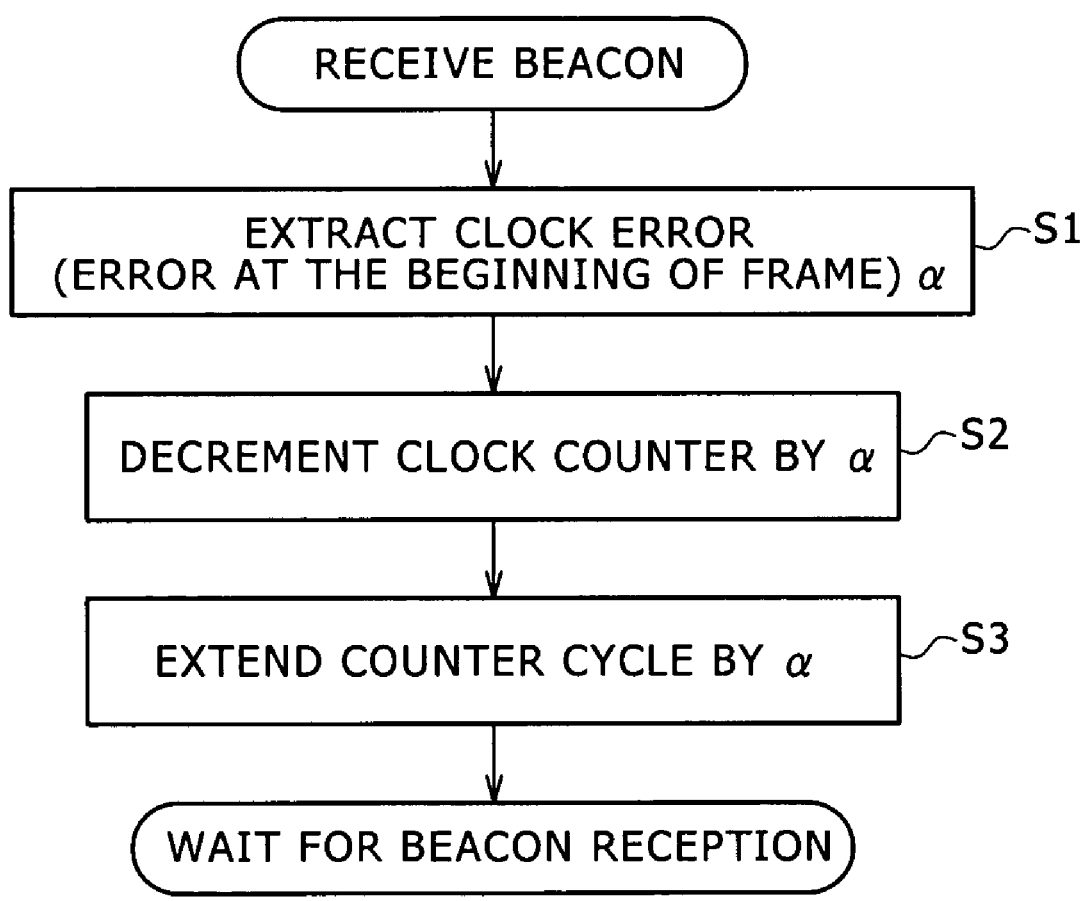
FIG. 6 is a flowchart showing a process to synchronize clocks between stations that interchange beacons.

FIG. 6 provides a flowchart showing a process to synchronize clocks (frames) between stations that interchange beacons.

When receiving a beacon, the communication station extracts a clock error (an error at the beginning of the frame) α (step S1). The beacon reception station decrements by α to correct a clock counter that measures one super frame (step S2). In this manner, communication station corrects the time misalignment at the beginning position.

Further, the beacon reception station extends the counter cycle per super frame by α (step S3) to synchronize a time progress rate, i.e., a clock (frame) cycle.

The examples in FIGS. 5 and 6 are limited to the method that synchronizes clocks between two communication stations. In this case, the beacon transmission station's clock is used as the reference to implement the process. On the other hand, there maybe a system in which three or more communication stations exist and two or more communication stations transmit beacons. In such case, it may be disputable which communication station should be selected as a source of the reference clock. For example, the synchronization may be provided so that a forward-clocked communication station adjusts itself to a backward-clocked communication station. In this case, the communication station to receive a beacon corrects the time misalignment (step S2) or synchronizes the clock cycle (step S4) only when clock error α becomes positive.

Figure 7:
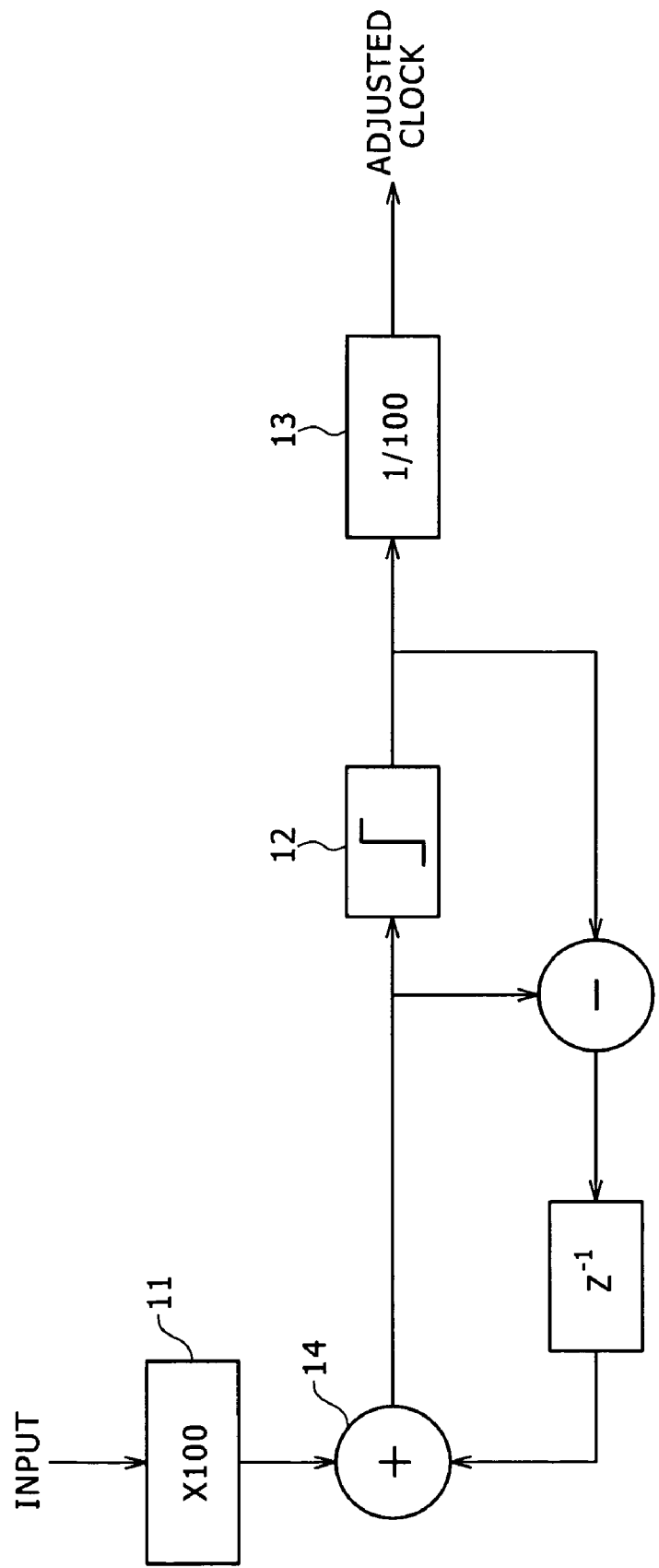
FIG. 7 shows a configuration example of a circuit that outputs a counter cycle extension.

FIG. 7 shows a configuration example of a circuit that outputs a counter cycle extension.

It is possible to increment the counter every microsecond. Actually, however, it is fully possible to consider a condition to increment every 100 microseconds. In this case, for example, a correction for 35 microseconds is equivalent to 0.35 counts and falls short of the unit count value. To solve this problem, the circuit configured as shown in FIG. 7 is used to alleviate quantization errors.

According to the example in FIG. 7, an ideal correction count value input needs the accuracy up to two places of decimals and is multiplied by 100 in a multiplication section 11. For example, 0.35 counts become 35.

A quantization section 12 quantizes this value every 100 to 0. Therefore, a division section 13 outputs 0. An addition section 14 calculates a value not output from the division section 13. The value 35 is added to the next value. As a result, the next value before quantization becomes 70 and another next value becomes 105.

The quantization section 12 quantizes value 150 to yield one count that is then output. Remainder 5 is likewise added to the next input value.

In this manner, the circuit accumulates a part smaller than one count as a result of the quantization. Accordingly, it is possible to minimize an error between the target beacon cycle and the actual setup value.

For convenience of description, FIG. 5 is so diagramed that each communication station synchronizes both the super frame's beginning position and the super frame's cycle. However, the autonomous distributed system may be configured so that all communication stations issue beacon signals and the respective communication stations use a beacon interval to uniquely define the super frame. Though super frame cycles match in such system, super frame's beginning positions do not align. In consideration for this, it should be understood that FIG. 5. represents synchronization with the beginning position of a slot constituting the super frame, not with the beginning position of the super frame itself.

C-2. Clock (Frame) Synchronization Method (2)

Figure 8:
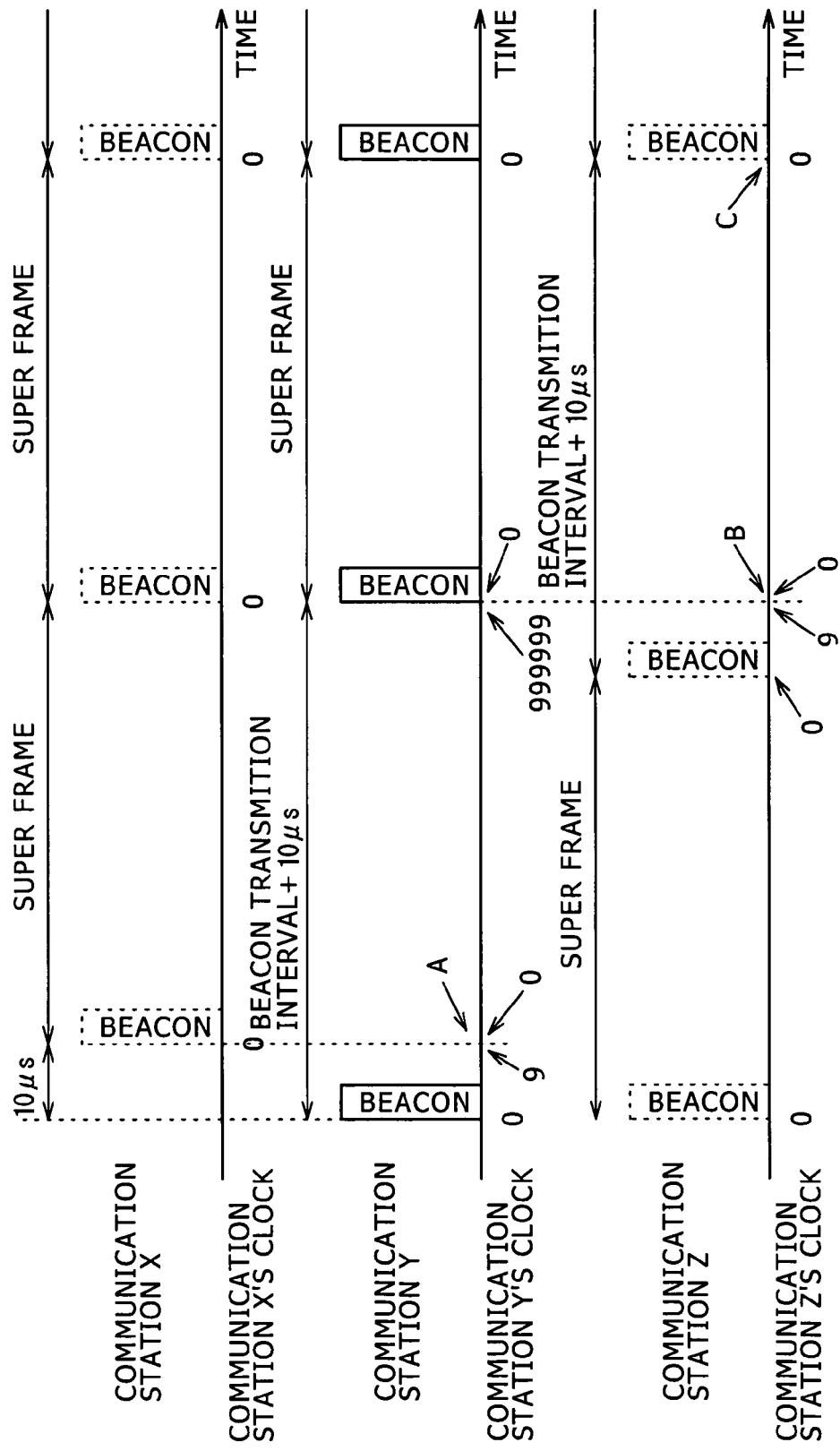
FIG. 8 diagrams how a beacon transmission station recognizes the other communication stations timestamped later than its own and adjusts timestamps.

Referring now to FIG. 8, the following describes a case where the beacon transmission station adjusts the timestamp by recognizing another communication station clocked later than the local station itself. According to the example in FIG. 8, three communication stations X through Z are operating in the network. At an initial stage of the operation, each communication station identifies one super frame in terms of a period to count the corresponding reference clock 1000000 times.

At point A in FIG. 8, communication station Y receives a beacon and the like to recognize a deviation from neighboring station X for 10 counts. Communication station Y delays the counter 10 counts to synchronize the counter. As a result, communication station Y transmits the second beacon 10 counts than before.

At point B in FIG. 8, communication station Z receives a beacon from communication station Y. When synchronizing the clock, communication station Z likewise recognizes a deviation of 10 counts. Communication station Z delays the counter 10 counts to synchronize the counter. However, the embodiment specifies up to three counts as limits to the clock error range that permits adjustment of a clock cycle or a beacon cycle. Communication station Z skips the adjustment of the clock cycle this time.

At point C, an attempt is again made to synchronize the clock. Since the cycle is unchanged, the clock error is measured to be 0. Accordingly, the cycle is unchanged at point C.

Communication station Y synchronizes the counter with communication station X. As a result, a beacon transmission interval is measured at point B for communication station Y and becomes equivalent to the normal super frame plus 10 counts of clock error. That is, since a cycle variation at point B is temporary, the subsequent cycle is the same as the original one. If this clock error is assumed to be a change of 10 counts in the super frame, communication station Z may incorrectly change the clock cycle.

When the communication station receives a beacon from a peripheral station, a clock error obtained from the beacon may increase suddenly. This situation may occur immediately after the beacon transmission station also shifts the timestamp for clock synchronization.

To solve this problem, the embodiment changes no cycle when too large a clock error (error at the beginning of the frame) occurs to exceed the allowable range. This prevents a change to an incorrect cycle, ensures resistance to clock variations, and stabilizes clock (frame) synchronization operations due to moderate cycle variations.

Figure 9:
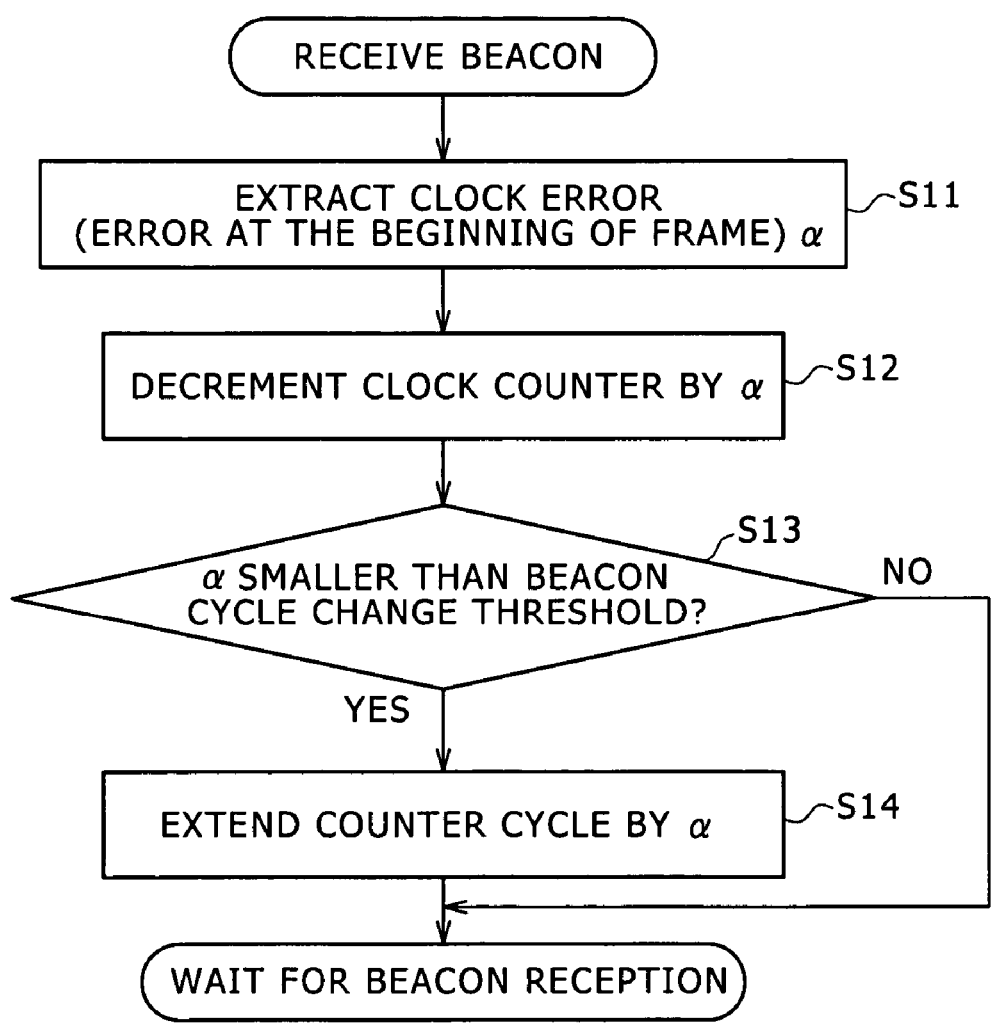
FIG. 9 is a flowchart showing a process to synchronize clocks between stations that interchange beacons.

FIG. 9 is a flowchart showing a process to synchronize clocks (frames) between stations that interchange beacons.

When receiving a beacon, the communication station extracts a clock error (an error at the beginning of the frame) α (step S11) and corrects the time misalignment (step S12).

The communication station determines whether or not clock error (an error at the beginning of the frame) α exceeds a specified beacon cycle change threshold (step S13).

When clock error (an error at the beginning of the frame) α does not exceed the specified beacon cycle change threshold, the communication station extends one super frame of counter cycle by α (step S14). This synchronizes the time progress rate, i.e., the clock (frame) cycle.

When clock error (an error at the beginning of the frame) α exceeds the specified beacon cycle change threshold, no clock cycle is synchronized. The reason follows. The clock may deviate due to a cause other than a clock cycle deviation. For example, a clock error suddenly increases after acquisition from a beacon the communication station receives from the peripheral station.

For convenience of description, FIG. 8 is so diagramed that each communication station synchronizes both the super frame's beginning position and the super frame's cycle. However, the autonomous distributed system may be configured so that all communication stations issue beacon signals and the respective communication stations use a beacon interval to uniquely define the super frame. Though super frame cycles match in such system, super frame's beginning positions do not align. In consideration for this, it should be understood that FIG. 5 represents synchronization with the beginning position of a slot constituting the super frame, not with the beginning position of the super frame itself.

C-3. Clock (Frame) Synchronization Method (3)

Figure 10:
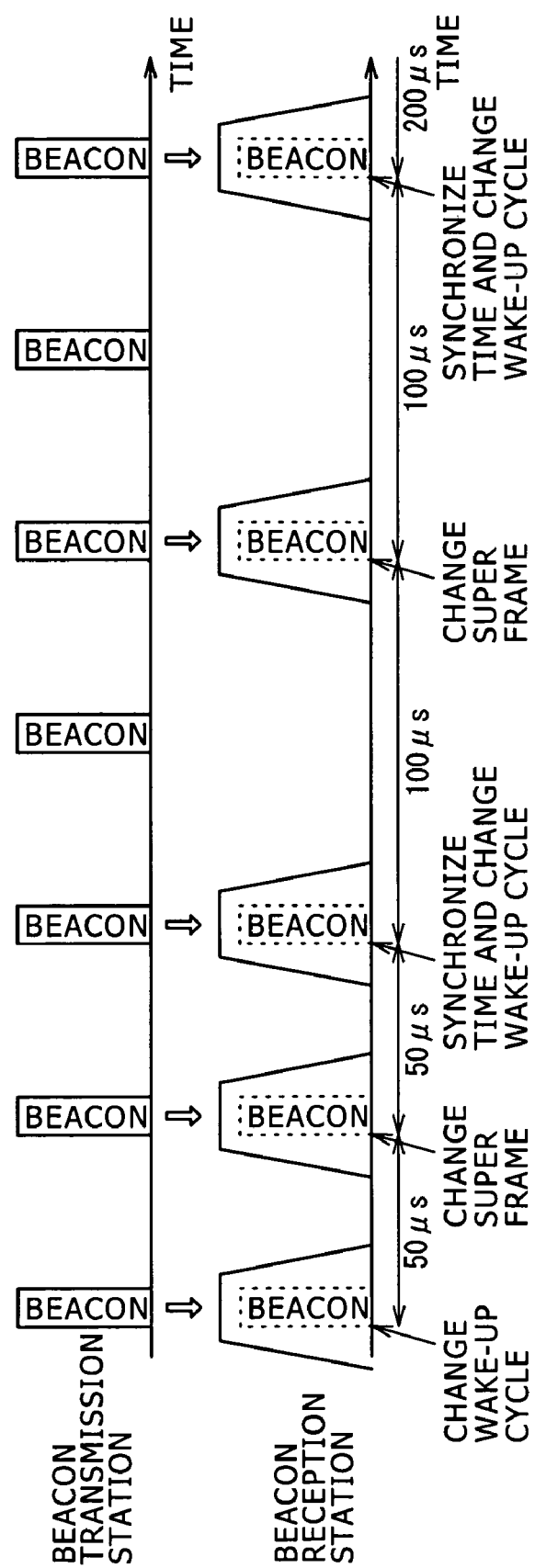
FIG. 10 diagrams operations to synchronize clock cycles due to a change of a wake-up cycle.

The wireless network according to the embodiment can use the sleep mode and permit respective communication stations to sleep at any time. In this case, each communication station returns to be active at a specified wake-up cycle. The communication station performs a scan operation to receive a beacon from a peripheral station for synchronization. FIG. 10 diagrams operations to synchronize clock cycles due to a change of a wake-up cycle (scan cycle).

When the communication station's clock advances 40 ppm per super frame, the clock advances 40 microseconds ever 1.0 second. Let us assume that the clock is counted every microsecond. When a wake-up cycle (scan cycle) is 1.0 second, the next scan results in a 40-count advance. For example, it is assumed that up to three counts are available as an allowable range for cycle adjustment as described in subsection C-2. In this case, 40 counts are outside the allowable range. Therefore, no clock cycle is synchronized.

Triggered by a clock error outside the allowable range, the sleep period is temporarily shortened and an attempt is made to frequently synchronize the clock. When the wake-up cycle is changed to 50 milliseconds, i.e., one twentieth of the normal cycle, for example, a clock deviation at the next wake-up becomes two counts within the allowable range.

Using this value, an attempt is made to synchronize the clock cycle. The communication station confirms that the next beacon indicates almost zero clock errors. The communication station then doubles the wake-up cycle (scan cycle) to 100 milliseconds.

After confirming that the clock error again becomes almost zero, the communication station further doubles the wake-up cycle (scan cycle) to 200 milliseconds and attempts the clock synchronization. In this manner, the clock cycle can be finally synchronized at the original wake-up cycle (scan cycle) of 1.0 second.

Figure 11:
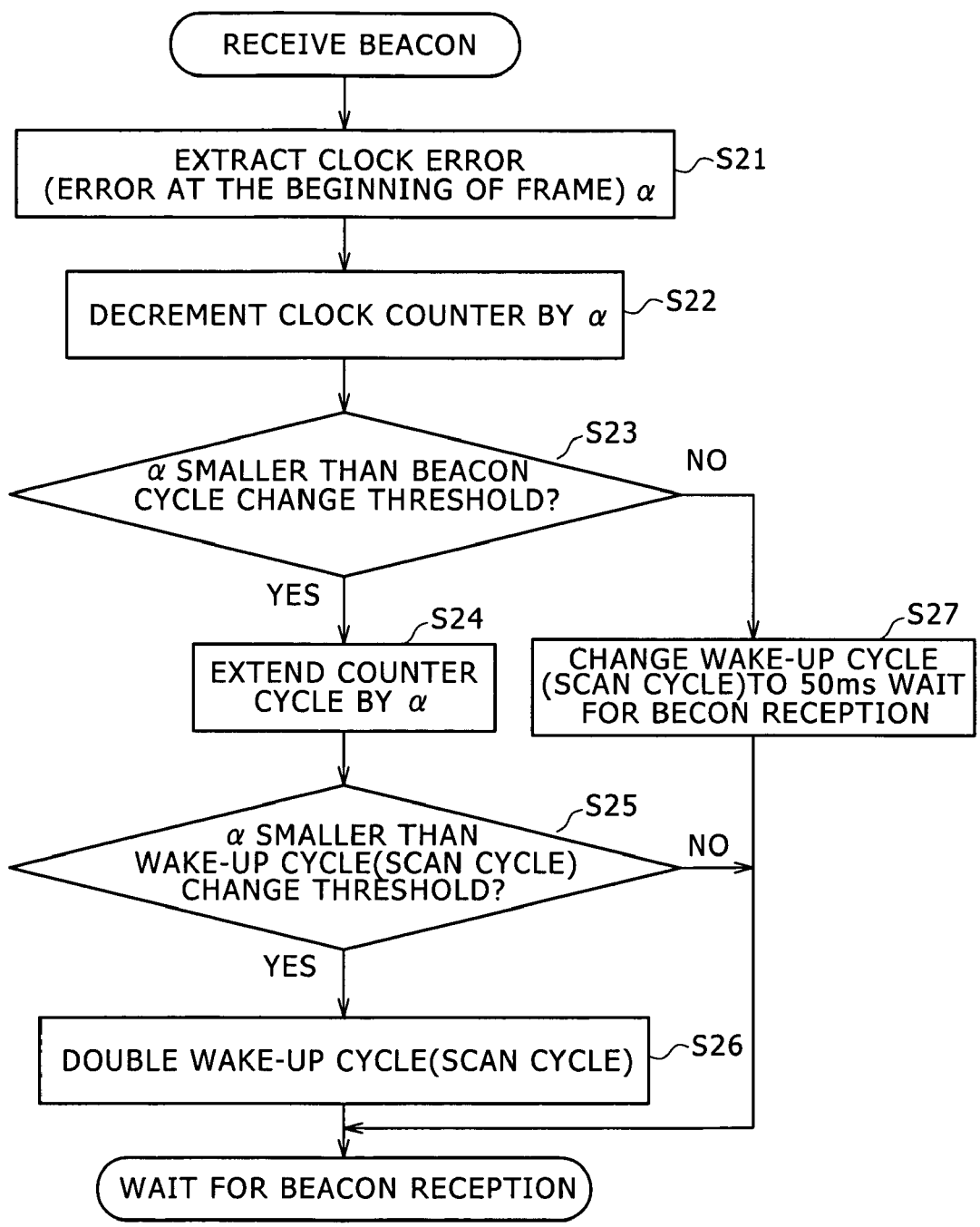
FIG. 11 is a flowchart showing a process to synchronize clocks between beacon interchanging stations.

FIG. 11 is a flowchart showing a process to synchronize clocks between beacon interchanging stations.

When receiving a beacon, the communication station extracts a clock error (an error at the beginning of the frame) α (step S21) and corrects the time misalignment (step S22).

The communication station determines whether or not clock error (an error at the beginning of the frame) α exceeds a specified beacon cycle change threshold (step S23).

When clock error (an error at the beginning of the frame) α does not exceed the specified beacon cycle change threshold, the communication station extends one super frame of counter cycle by α (step S24). This synchronizes the time progress rate, i.e., the clock (frame) cycle.

The communication station determines whether or not clock error (an error at the beginning of the frame) α exceeds a specified wake-up cycle (scan cycle) change threshold (step S25). When clock error (an error at the beginning of the frame) α does not exceed the specified wake-up cycle (scan cycle) change threshold, the communication station determines that the frame cycle is synchronized. The wake-up cycle (scan cycle) is doubled (step S26), for example. When clock error (an error at the beginning of the frame) α exceeds the specified wake-up cycle (scan cycle) change threshold, it is highly possible that no frame cycle is synchronized. The wake-up cycle (scan cycle) is not changed.

Let us go back to step S23. When clock error (an error at the beginning of the frame) α exceeds the specified beacon cycle change threshold, no clock cycle is synchronized. The reason follows. The clock may deviate due to a cause other than a clock cycle deviation. For example, a clock error suddenly increases after acquisition from a beacon the communication station receives from the peripheral station. Triggered by a clock error outside the allowable range, the wake-up cycle is changed to 50 milliseconds, i.e., one twentieth of the normal cycle (step S27). An attempt is made to frequently synchronize the clock.

In this manner, the communication station gradually extends the wake-up cycle to synchronize the clock cycle. The clock cycle can be ensured even during a long sleep period. Further, the maximum sleep period can be specified irrespectively of the clock accuracy.

For convenience of description, FIG. 10 is so diagramed that each communication station synchronizes both the super frame's beginning position and the super frame's cycle. However, the autonomous distributed system may be configured so that all communication stations issue beacon signals and the respective communication stations use a beacon interval to uniquely define the super frame. Though super frame cycles match in such system, super frame's beginning positions do not align. In consideration for this, it should be understood that FIG. 5 represents synchronization with the beginning position of a slot constituting the super frame, not with the beginning position of the super frame itself.

C-4. Clock (Frame) Synchronization Method (4)

Figure 12:
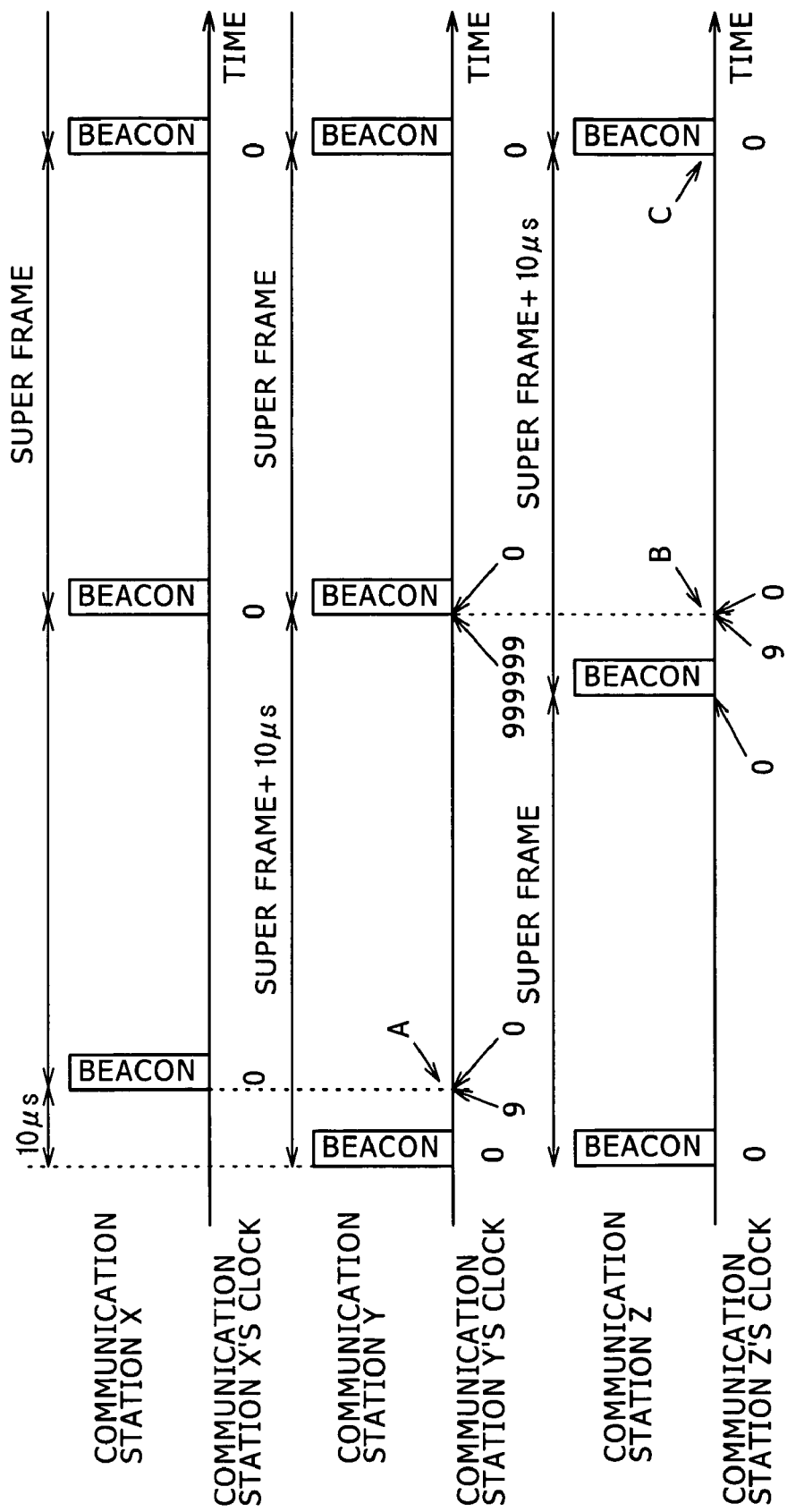
FIG. 12 diagrams how a beacon transmission station recognizes the other communication stations timestamped later than its own and adjusts timestamps.

Referring now to FIG. 12, like subsection C-2, the following describes a case where the beacon transmission station adjusts the timestamp by recognizing another communication station clocked later than the local station itself. According to the example in FIG. 8, three communication stations X through Z are operating in the network. At an initial stage of the operation, each communication station identifies one super frame in terms of a period to count the corresponding reference clock 1000000 times. As premises, each communication station performs a scan operation at a specified scan cycle. The communication station provides a scan cycle smaller than or equal to the maximum scan cycle.

At point A in FIG. 12, communication station Y receives a beacon and the like to recognize a deviation from neighboring station X for 10 counts. Communication station Y delays the counter 10 counts to synchronize the counter. As a result, communication station Y transmits the second beacon 10 counts than before. At this time, communication station Y sets a flag indicating a counter value change during the maximum scan cycle after the counter value is adjusted.

At point B in FIG. 12, communication station Z receives a beacon from communication station Y. When making an attempt to synchronize the clock, communication station Z likewise recognizes a deviation of 10 counts. Communication station Z delays the counter 10 counts to synchronize the counter. Since the received beacon is provided with the flag indicating the counter value change, however, communication station Z skips the cycle adjustment this time.

Let us assume that the communication station synchronizes the counter for time adjustment. A clock error (an error at the beginning of the frame) is measured by receiving a beacon from the communication station and indicates a deviation equivalent to the adjustment amount. However, it is incorrect to assume that this error indicates a change of the clock (frame) cycle. The cycle in the steady state may be unchanged.

According to the example in FIG. 12, communication station Y synchronizes the counter with communication station X. As a result, a beacon transmission interval is measured at point B for communication station Y and becomes equivalent to the normal super frame plus 10 counts of clock error. That is, since a cycle variation at point B is temporary, the subsequent cycle is the same as the original one. If this clock error (error at the beginning of the frame) is assumed to be a change of 10 counts in the super frame, communication station Z may incorrectly change the clock cycle.

To solve this problem, the embodiment provides a beacon with the clock change flag indicating completion of the clock (frame) synchronization. When the flag is turned on, the cycle change is skipped to prevent an incorrect change.

Figure 13:
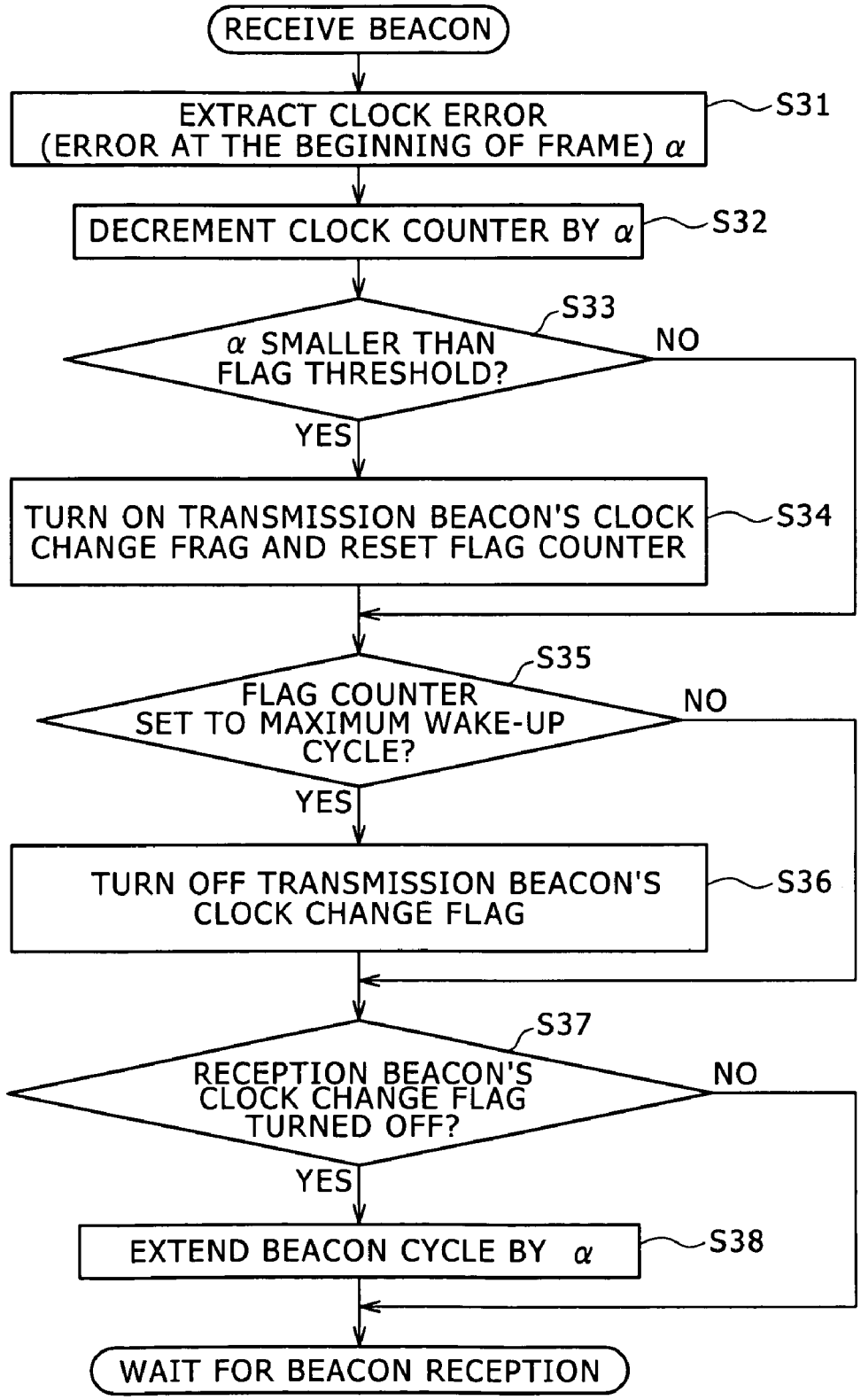
FIG. 13 is a flowchart showing a process to synchronize clocks between beacon interchanging stations.

FIG. 13 is a flowchart showing a process to synchronize clocks (frames) between beacon interchanging stations.

When receiving a beacon, the communication station extracts a clock error (an error at the beginning of the frame) α (step S31) and corrects the time misalignment (step S32).

The communication station determines whether or not clock error (an error at the beginning of the frame) α exceeds a specified flag threshold (step S33). When the flag threshold is exceeded, the communication station turns on a transmission beacon's clock change flag from the local station and resets the flag counter (step S34).

The communication station determines whether or not the flag counter reaches the maximum wake-up cycle (step S35). When the flag counter reaches the maximum wake-up cycle, the communication station turns off the transmission beacon's clock change flag (step S36).

When receiving a beacon, the communication station checks the reception beacon's clock change flag (step S37). When the clock change flag is off, the communication station extends the counter cycle per super frame by α (step S38). In this manner, the communication station synchronizes the time progress rate, i.e., the clock (frame) cycle.

When the clock change flag is on, the communication station skips the cycle change to prevent an incorrect change due to the clock error (an error at the beginning of the frame) caused by the counter synchronization.

For convenience of description, FIG. 8 is so diagramed that each communication station synchronizes both the super frame's beginning position and the super frame's cycle. However, the autonomous distributed system may be configured so that all communication stations issue beacon signals and the respective communication stations use a beacon interval to uniquely define the super frame. Though super frame cycles match in such system, super frame's beginning positions do not align. In consideration for this, it should be understood that FIG. 5 represents synchronization with the beginning position of a slot constituting the super frame, not with the beginning position of the super frame itself.

C-5. Clock (Frame) Synchronization Method (5)

The reference time for a newly entered beacon differs from that for the existing network. Accordingly, when the first beacon is received, this difference is detected as a clock error (an error at the beginning of the frame).

With no problem, the existing station receives a beacon from a newly entered station and changes the local station's counter or timestamp using the detected clock error (an error at the beginning of the frame). However, it is incorrect to change the clock (frame) cycle assuming the clock error (an error at the beginning of the frame) to be a clock cycle variation. This is because a clock (frame) cycle difference cannot be estimated before a clock error (an error at the beginning of the frame) measured after the communication stations synchronize their reference timestamps or counters.

To solve this problem, the embodiment does not correct the clock (frame) cycle using the value of a clock error (an error at the beginning of the frame) estimated from the first beacon issued from a newly entered terminal. This prevents the clock cycle from being changed incorrectly.

Figure 14:
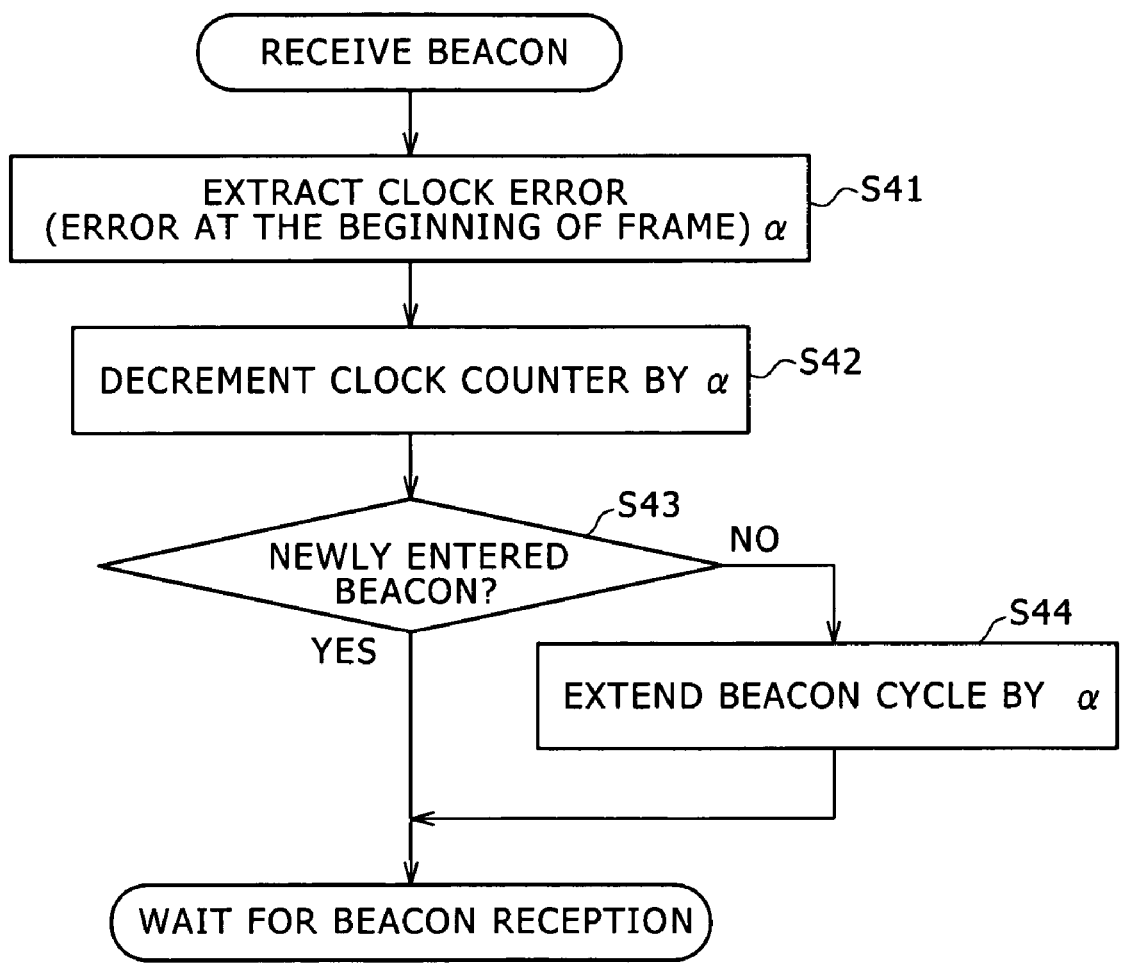
FIG. 14 is a flowchart showing a process to synchronize clocks between beacon interchanging stations.

FIG. 14 is a flowchart showing a process to synchronize clocks (frames) between beacon interchanging stations.

When receiving a beacon, the communication station extracts a clock error (an error at the beginning of the frame) α (step S41) and corrects the time misalignment (step S42).

The communication station determines whether or not the received beacon is issued from a newly entered station (step S43).

When the received beacon is not issued from the newly entered station, the communication station extends the counter cycle per super frame by α (step S44). In this manner, the communication station synchronizes the time progress rate, i.e., the clock (frame) cycle.

When the received beacon is issued from the newly entered station, the communication station does not correct the clock (frame) cycle to prevent an incorrect clock cycle change.

There has been described in detail the present invention with reference to the specific embodiment. However, it is to be distinctly understood by those skilled in the art that various changes and modifications may be made in the present invention without departing from the spirit and scope thereof.

The specification has mainly described the embodiment that applies the present invention to the autonomous distributed wireless network. It is obvious that the present invention can be applied to the other networks than the autonomous distributed network.

Further, the present invention can be applied to media access control of channels in a multi-channel communication system in which communication stations communicate with each other on a plurality of frequency channels in a hopping manner.

While the specification has described the embodiment of the present invention using the wireless LAN as an example, the concept of the present invention is not limited thereto. The present invention can be appropriately applied to an Ultra Wide Band communication system that sends and receives signals in the environment of lower SNR.

In short, the present invention has been disclosed in the form of exemplification. The contents of the specification should not be interpreted restrictively. To understand the subject matter of the present invention, the appended claims should be taken into consideration.

What is claimed is:

1. A wireless communication apparatus operating in a wireless communication environment where communication stations communicate with each other at specified frame cycles, said apparatus comprising:
   communication means for sending and receiving wireless data on a communication channel;
   notification signal generation means for generating a notification signal containing time information about a frame cycle;
   notification signal analysis means for analyzing a notification signal received from a peripheral station; and
   synchronization means for, based on time information obtained from a notification signal received from a peripheral station, synchronizing a frame cycle beginning position in relation to said peripheral station and adjusting frame cycle synchronization.

2. The wireless communication apparatus according to claim 1 further comprising:
   a clock generator and means for counting clocks output from said clock generator to measure a frame cycle, wherein, if time information is obtained from a notification signal received from a peripheral station, said synchronization means measures a frame cycle beginning position error obtained based on the time information as clock count error α, subtracts α from a count value to synchronize the frame cycle beginning position, and extends the count value per frame by α to synchronize the frame cycle.

3. The wireless communication apparatus according to claim 1, wherein, if a frame cycle beginning position error with respect to a peripheral station exceeds a specified threshold, said synchronization means synchronizes the frame cycle beginning position with said peripheral station but does not synchronize the frame cycle.

4. The wireless communication apparatus according to claim 1, further comprising:
   scan operation means for receiving said notification signal at a specified scan cycle,
   wherein said synchronization means detects a frame cycle beginning position error based on a received notification signal and said scan operation means increases said scan cycle if the frame cycle beginning position error is smaller than a specified threshold.

5. The wireless communication apparatus according to claim 4, wherein said scan operation means shortens a scan cycle if a frame beginning position error with reference to a peripheral station exceeds a specified threshold.

6. The wireless communication apparatus according to claim 1, wherein said notification signal generation means provides a notification signal, including a flag, immediately after synchronization, and said synchronization means, upon reception of said notification signal, synchronizes a frame cycle beginning position with said first communication station but does not synchronize the frame cycle if a frame beginning position error exceeds a specified threshold.

7. The wireless communication apparatus according to claim 1, wherein said synchronization means, upon reception of a notification signal from a newly entered station, synchronizes a frame cycle beginning position but does not synchronize the frame cycle.

8. A wireless communication method employed by a wireless communication apparatus in a wireless communication environment where notification signals are transmitted periodically, the method comprising:
   generating a notification signal, at the apparatus, containing clock cycle time information;
   analyzing a notification signal, at the apparatus, received from a peripheral station; and
   synchronizing, at the apparatus, a frame cycle beginning position in relation to a peripheral station, the synchronization being based on time information obtained from the notification signal received from said peripheral station; and
   adjusting frame cycle synchronization at the apparatus.

9. A computer-readable medium storing computer-readable instructions thereon, the computer-readable instructions when executed by a computer cause the computer to perform the steps comprising:
   generating a notification signal containing clock cycle time information;
   analyzing a notification signal received from a peripheral station; and
   synchronizing a frame cycle beginning position in relation to the peripheral station based on the clock cycle time information obtained from the notification signal received from said peripheral station; and
   adjusting frame cycle synchronization.

* * * * *